United States Patent [19]
Fujita

[11] Patent Number: 5,485,892
[45] Date of Patent: Jan. 23, 1996

[54] DRIVE CONTROL SYSTEM FOR AUTOMOBILE

[75] Inventor: Kenji Fujita, Yokohama, Japan

[73] Assignee: Mazda Motor Corporation, Hiroshima, Japan

[21] Appl. No.: 438,727

[22] Filed: May 10, 1995

Related U.S. Application Data

[63] Continuation of Ser. No. 959,915, Oct. 14, 1992, abandoned.

[30] Foreign Application Priority Data

Oct. 14, 1991 [JP] Japan ..................... 3-293626

[51] Int. Cl.⁶ ..................... B62D 6/00
[52] U.S. Cl. ............ 180/167; 342/71; 364/426.01
[58] Field of Search ............ 180/167, 169, 180/272; 364/424.05, 426.01, 426.02, 426.03, 424.02; 342/70, 71

[56] References Cited

U.S. PATENT DOCUMENTS

| | | | |
|---|---|---|---|
| 4,308,536 | 12/1981 | Sims, Jr. et al. .................. 342/70 |
| 4,565,997 | 1/1986 | Seko et al. ..................... 180/272 X |
| 4,594,583 | 6/1986 | Seko et al. ..................... 180/272 X |
| 4,604,611 | 8/1986 | Seko et al. ..................... 180/272 X |
| 4,611,199 | 9/1986 | Seko et al. ..................... 180/272 X |
| 4,998,593 | 3/1991 | Karnopp et al. ............ 364/426.02 X |
| 5,057,834 | 10/1991 | Nordstrom ..................... 180/272 X |
| 5,101,351 | 3/1992 | Hattori ......................... 180/169 X |
| 5,172,317 | 12/1992 | Asanuma et al. ............... 180/169 X |
| 5,233,527 | 8/1993 | Shinnosuke .................... 180/169 X |

FOREIGN PATENT DOCUMENTS 64-26913   1/1989   Japan .

*Primary Examiner*—Brian L. Johnson
*Attorney, Agent, or Firm*—Keck, Mahin & Cate

[57] ABSTRACT

A plurality of drive control programs are selectively used to automatically control a car according to a driving situation recognized based on circumstances of a path ahead in which the car is traveling.

18 Claims, 10 Drawing Sheets

Fig. 2

| DRIVE SITUATION | | CONTROL PROGRAM | | | |
|---|---|---|---|---|---|
| | | CRUISE SPEED CONTROL | TURNING SPEED CONTROL | RELATIVE SPEED CONTROL | TARGET SPEED CONTROL |
| NO PRECEDING CAR | STRAIGHT | ○ | | | |
| | CURVE | ○ | ○ | | |
| FOLLOWING PRECEDING CAR | NORM. DRIVE STRAIGHT | ○ | | ○ | |
| | NORM. DRIVE CURVE | ○ | ○ | ○ | |
| | HEAVY TRAFFIC | ○ | | | ○ |

Fig. 3

| DRIVE SITUATION | | CONTROL PROGRAM |
|---|---|---|
| A | A1 | SPEED CONTROL |
| | A2 | RIGHT STEERING CONTROL |
| | A3 | LEFT STEERING CONTROL |
| | A4 | SPEED & RIGHT STEERING CONTROL |
| | A5 | SPEED & LEFT STEERING CONTROL |
| B | B1 | SPEED CONTROL |
| | B2 | RIGHT STEERING CONTROL |
| | B3 | LEFT STEERING CONTROL |
| | B4 | SPEED & RIGHT STEERING CONTROL |
| | B5 | SPEED & LEFT STEERING CONTROL |
| C | C1 | SPEED CONTROL |
| | C2 | RIGHT STEERING CONTROL |
| | C3 | LEFT STEERING CONTROL |
| | C4 | SPEED & RIGHT STEERING CONTROL |
| | C5 | SPEED & LEFT STEERING CONTROL |

$P_0 - P_2$ BRAKING CONTROL $P_0 - P_3$ STEERING CONTROL $P_0 - P_4$ BRAKING CONTROL
$P_4 - P_5$ STEERING CONTROL

P₀–P₂  BRAKING CONTROL

P₀–P₃  STEERING CONTROL

P₀–P₄  BRAKING CONTROL
P₄–P₅  STEERING CONTROL $P_0 - P_2$ BRAKING CONTROL $P_0 - P_3$ STEERING CONTROL $P_0 - P_4$ BRAKING CONTROL

P₀–P₅ BRAKING CONTROL
P₄–P₆ STEERING CONTROL

P₀–P₇ BRAKING CONTROL
P₇–P₈ STEERING CONTROL

*Fig. 19*

| DRIVE SITUATION | OPERATION | | CONTROL PROGRAM | | | | |
|---|---|---|---|---|---|---|---|
| | BRAKE | STEER | | | | | |
| A | × | × | A1 | A2 | A3 | A4 | A5 |
| | ○ | × | X | A2 | A3 | X | X |
| | × | ○ | A1 | X | X | X | X |
| | ○ | ○ | X | X | X | X | X |
| B | × | × | B1 | B2 | B3 | B4 | B5 |
| | ○ | × | X | B2 | B3 | X | X |
| | × | ○ | B1 | X | X | X | X |
| | ○ | ○ | X | X | X | X | X |
| C | × | × | C1 | C2 | C3 | C4 | C5 |
| | ○ | × | X | C2 | C3 | X | X |
| | × | ○ | C1 | X | X | X | X |
| | ○ | ○ | X | X | X | X | X |

DRIVE CONTROL SYSTEM FOR AUTOMOBILE

This is a continuation of application Ser. No. 07/959,915, filed on Oct. 14, 1992, now abandoned.

BACKGROUND OF THE INVENTION

1. Field of the Invention

The present invention relates to a drive control system for an automobile and, more particularly, to a safety drive control system for an automobile which recognizes environmental circumstances so as to avoid obstructions.

2. Description of Related Art

Self-controlled driving cars are provided with an automatic drive control system which automatically recognizes environmental circumstances of a path ahead of the car so as to guide the car safely. An automatic drive control system, described in Japanese Unexamined Patent Publication No. 64-26913, includes a video camera for providing a stereo image based on which the car is automatically controlled so as to avoid a crash against an obstruction on the path ahead detected in the stereo image. The automatic drive control system can be conveniently used, even in cars driven by a driver. For instance, a car with an automatic cruise control feature has been on the market. Various drive control systems, such as an automatic steering control system and an automatic braking system, have been proposed to back up a driver's operation in order to automatically avoid car crashes.

However, conventional automatic drive control systems have a drawback in that they can not perform proper drive controls according to various drive situations. It is desired to control driving of a car with different algorithms for different drive situations, such as high speed driving, mountain trail driving, driving in heavy traffic, etc., and for different obstructions against which the car is expected to crash, such as guard rails on shoulders of a road, a preceding car on the path ahead, etc. The conventional automatic drive control system can not perform a control appropriate for various drive situations, so that it is difficult to take an emergency control for avoiding crashes.

SUMMARY OF THE INVENTION

It is an object of the present invention to provide an automatic drive control system for a car which can perform proper controls appropriate for various drive situations so as to certainly avoid crashing of the car.

The above object of the present invention is achieved by providing an automatic drive control system for a car which has recognizing means for recognizing conditions of a path ahead the car, such as a video camera, and a radar. According to a drive situation of the car, which is determined on the basis of conditions recognized by the recognizing means, a control scheduling means selects at least one of a plurality of control programs. Car control elements, such as a braking system and a steering system, are automatically controlled with the most proper control program to drive the car so as to avoid a possible crash against an obstruction in the path ahead of the car.

The automatic drive control system further includes a driver's operation diagnosis means which recognizes whether a driver is consciously driving or unconscious or asleep. The scheduling means selects control programs according to whether or not the driver is conscious as well as according to a drive situation of the car.

According to the automatic drive control system of the present invention, since the most proper control program is selected according to a drive situation, the car is desirably controlled. Specifically, each program controls a traveling speed and/or steering so as to avoid a predicted crash of the car against an obstruction, such as a guard rail, a preceding car and road obstructions in the path ahead of the car.

BRIEF DESCRIPTION OF THE DRAWINGS

The above and other objects and features of the present invention will be understood from the following description with respect to preferred embodiments thereof when considered in conjunction with the appended drawings, in which:

FIG. 2 is a table indicating selections of control programs according to various drive situations;

FIG. 3 is a table indicating control programs according to various drive situations for an automatic drive control systems in accordance with another preferred embodiment of the present invention;

FIG. 19 is a table indicating control programs according to various drive situations for the automatic drive control system shown in FIG. 18.

DETAILED DESCRIPTION OF THE PREFERRED EMBODIMENTS

Figure 1:
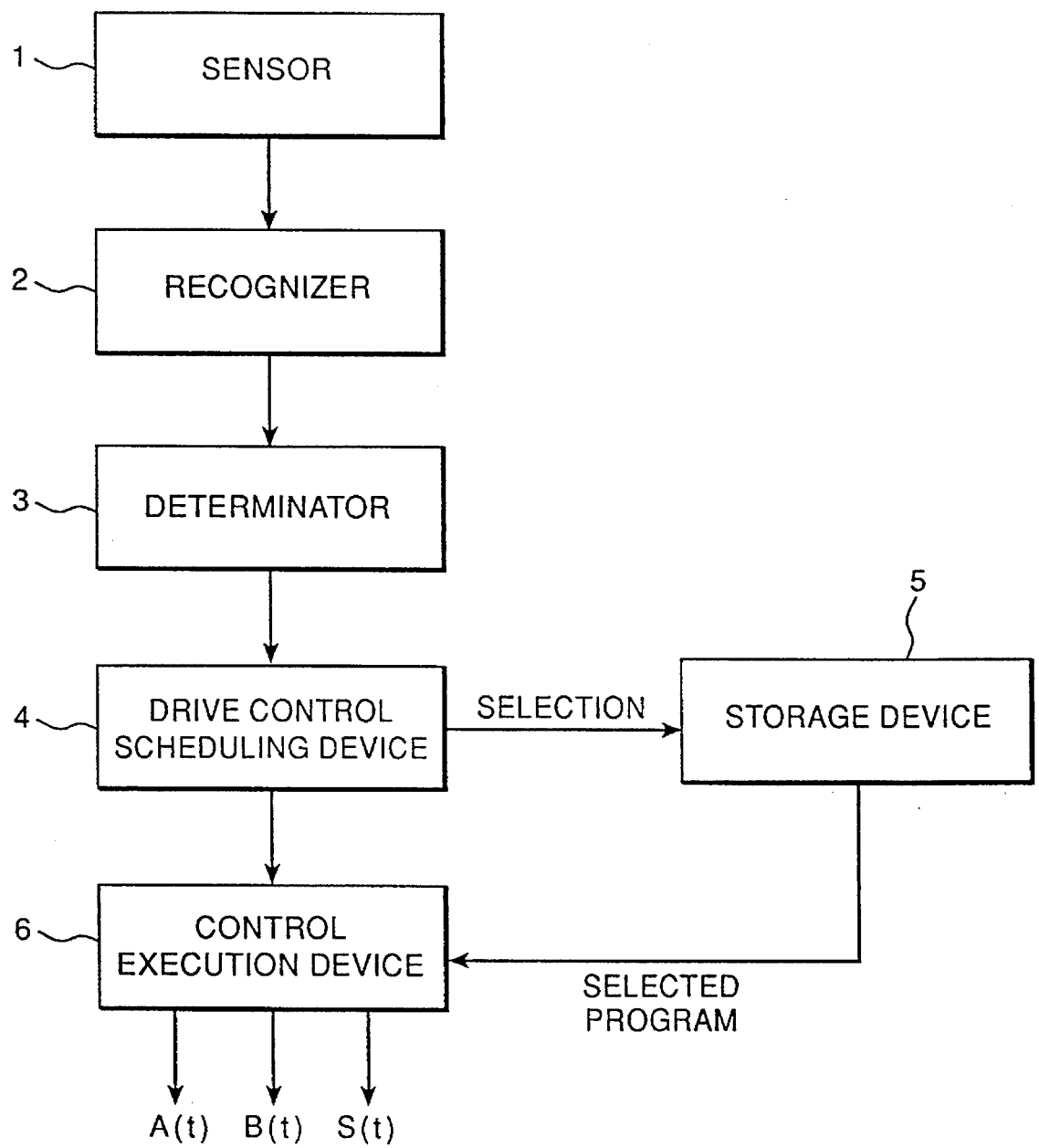
FIG. 1 is a schematic block diagram showing an automatic drive control system in accordance with a preferred embodiment of the present invention.

Referring to the drawings in detail and, in particular, to FIG. 1, an automatic drive control system in accordance with a preferred embodiment of the present invention is shown in a block diagram as an automatic speed control system.

Typically, an automatic cruise control system keeps a speed of a car set by a driver. Even when driving a car in automatic cruising following a preceding car, a driver must manually adjust a safe distance relative to the preceding car. The driver also manually decelerates the car while driving through a curve.

The automatic drive control system includes a sensor 1 for gathering environmental information of a path ahead the car, such as a video camera and a radar. If a video camera is used as the sensor 1, it provides a video image of the path ahead of the car as environmental information. On the other hand, if a radar is used as the sensor 1, it provides information relating to a distance between the car and obstructions on the path ahead of the car as environmental information. The environmental circumstances of the car are recognized by a recognizor 2 on the basis of the environmental information gathered by the sensor 1. If a set of two video cameras are used as the sensor 1 to provide a stereo image of a path ahead the car, the recognizor 2 recognizes the environmental circumstances by using a three dimensional coordinate system.

A determinator 3 determines a driving situation based on the result of recognition by the recognizor 2. The term "drive situation" used herein shall mean and refer to whether the car follows a preceding car, whether the car is on a straight path, whether the car is on a curve, etc. The determinator 3, in which data representative of several possible driving situations is provided, determines one of the driving situations on the basis of the result of recongnition by the recognizor 2. For example, when the recognizor recognizes an obstruction or something else in a video image recognized as a preceding car on the path ahead the determinator 3 determines that a driving situation is present in which the car follows a preceding car. If there is a white line in a video image of the path ahead, the determinator 3 determines that a driving situation is present in which the car is on a curving path.

A drive control scheduling device 4 makes an optimized drive control schedule according to the driving situation determined by the determinator 3. A control program storage device 5 stores a plurality of control programs for controlling the car. The drive control scheduling device 4 selects one of the control programs or a combination of more than one of the control programs according to a driving situation determined by the determinator 3. A control execution device 6 executes a control program selected by the drive control scheduling device 4 so as to control the car. For example, the control execution device 6 then provides control signals A(t), B(t) and S(t) for controlling actuators of an accelerator, a brake system and a steering system, respectively.

Referring to FIG. 2, there are shown, in Table I, five different driving situation, such as (1) driving on a straight path on which no preceding car travels (straight path driving situation); (2) driving on a curved path on which no preceding car travels (curved path driving situation); (3); normal driving on a straight path on which a preceding car travels (normal and straight path-following driving situation; (4) normal driving on a curved path on which a preceding car travels (normal and curved path-following driving situation); and (5) heavy traffic driving on a path on which a preceding car travels (heavy traffic driving situation). Data representative of these driving situations are set in the determinator 3. In these drive situations, four different drive control programs, such as (1) cruise speed control; (2) turning speed control; (3) relative speed control; and (4) target speed control, are selectively performed. Data representative of the four different driving control programs is stored in the storage device 5. These speed controls are defined as follows:

(1) The cruise speed control is a speed control to keep a cruise speed Vd set by the automatic cruise control system. In the cruise speed control, a speed Vp (which is referred to as a future speed) a time T in seconds later from now is controlled so as to reach the cruise speed Vd. The future speed Vp is calculated from the following formula:

$$Vp=V+aT$$

wherein

V is a current speed; and a is an acceleration.

(2) The turning speed control is a speed control to control a speed for driving on a curved path. In the turning speed control, a speed V of the car is controlled so that a lateral acceleration Vp (which is referred to as a future lateral acceleration) a time T in seconds later from now is not beyond an allowable lateral acceleration Ad. The future lateral acceleration Ap is calculated from the following formula:

$$Ap=Vp^2/r$$

wherein r is a turning radius (3) The relative speed control is a control for controlling a speed of the car relative to a speed of a preceding car on the path ahead. The car has its own safety relative distance Td relative to a preceding car which must be kept in order to safely avoid a crash against the preceding car. When the car driving at a speed V is at a distance D behind the preceding car driving at a speed V1, a predicted distance Tp relative to the preceding car a time t after now is determined as follows:

$$Tp=(V1\times t-V\times t+D)$$

In this relative speed control, the speed of the car V is controlled so as to make the predicted distance Tp equal to the predetermined safe relative distance Td.

(4) The target speed control is a control for controlling a speed necessary to travel to a target location. In the target speed control, a speed V of the car is controlled so that an unfinished distance Dp, which is defined as a difference in distance between a distance L to the target location and a traveled distance for a predicted time t in seconds, is zero (0). The unfinished distance Dp is calculated as follows:

$$Dp=L-V\times t$$

All of these speed controls are performed by controlling operations of the accelerator and the brake system. For example, when an acceleration is demanded, the brake system releases a brake if the brake has been applied and the accelerator is operated if the brake is not applied. On the other hand, when a deceleration is demanded, the accelerator is released if it has been operated and the brake system is applied if the accelerator is not operated.

The automatic drive control system selects at least one of the four speed controls indicated by a circle in Table I shown in FIG. 2 and performs controls as follows:

(1) In the straight path driving situation, only the cruise speed control is selected and performed.

(2) In the curved path driving situation, both the cruise speed control and the turning speed control are selected, but either one of them, by which a speed V of the car is controlled lower than by the other, is performed.

(3) In the normal and straight path-following driving situation, both of the cruise speed control and the relative speed control are selected, but either one of them, by which a car speed V of the car is controlled lower than by the other, is performed.

(4) In the normal and curved path-following driving situation, all of the speed controls, excepting the target speed control, are selected, but either one of them, by which a car speed V of the car is controlled to be the lowest, is performed.

(5) In the heavy traffic driving situation, the cruise speed control and the target speed control are selected, but that control which controls a car speed V so that it is lowest, is performed.

An automatic drive control system in accordance with another preferred embodiment is used as a drive speed control system with a steering back-up feature for automatically avoiding a front-end collision of a car against a preceding car on a path ahead.

FIG. 3 shows various drive situations and control programs performed by the automatic drive control system. Because the automatic drive control system has a function of avoiding collisions, the determinator 3 has data concerning possible collisions, and the control program storage device 5 stores steering control programs for controlling steering necessary to avoid collisions. Driving situations are classified into three situations, namely, a drive situation A, a drive situation B and a drive situation C. For each drive situation A, B or C, five steering control programs, which are represented by A1 to A5, B1 to B5 or C1 to C5, are provided.

Figure 4:
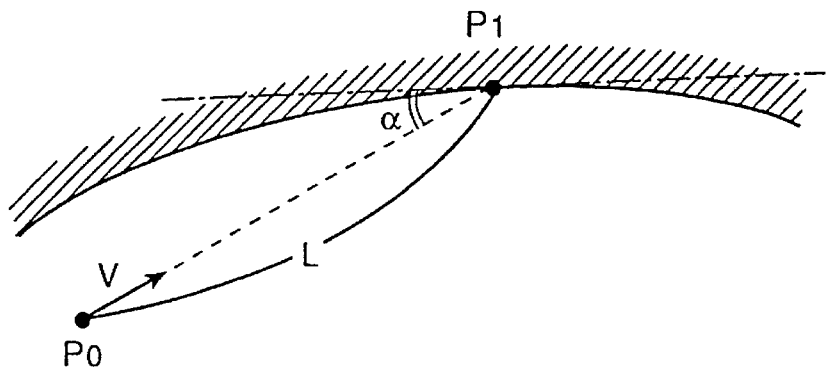
FIGS. 4–6 are explanatory views illustrating drive situations provided in the table of FIG. 3.

The drive situations A to C are defined with reference to FIGS. 4 to 6 as follows:

(1) In the drive situation A, as shown in FIG. 4, if the car travels in a straight path from a present position P0 while keeping a car speed V, it crashes into an object on a shoulder of a road, such as a guard rail, at a predicted crash position P1 at a distance L from the present position P0 and at a crash angle a.

Figure 5:
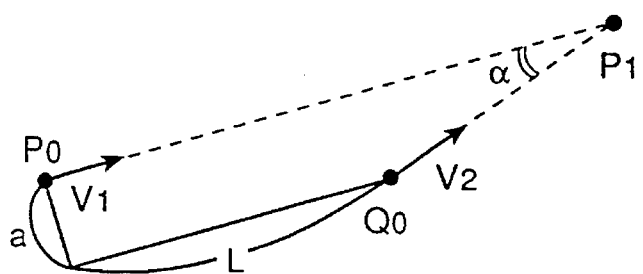

(2) In the drive situation B, as shown in FIG. 5, if the car travels in a straight path, keeping a car speed V1, and a preceding object, such as a car, a bicycle, etc., travels ahead of the car at a speed V in a straight path intersecting the path of the car at an angle a from a position Q0, which is at a lateral distance "a" from the path of the car and at a distance L ahead from the position P0. The car will possibly crash into the preceding car at a predicted crash position P1.

Figure 6:
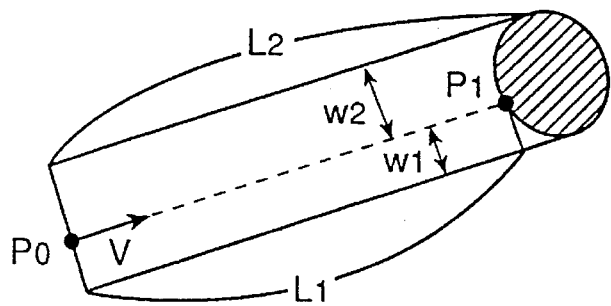

(3) In the drive situation C, as shown in FIG. 6, if the car travels in a straight path from a position P0, keeping a car speed V, it possibly will crash into a stationary obstruction in a path ahead, such as an illumination pole, an electric-light pole, or a pylon, at a predicated crush position P1 a distance L from the position P0. In FIGS. 5 and, reference characters W1 and W2 denote right and left lateral safety distances from the path of the car.

For these drive situations, there are provided five different control programs such as a brake control, a steering control and a combination of the two.

(1) First control program (A1, B1 and C1) performs the brake control only.

(2) Second control program (A2, B2 and C2) performs a right turn steering control only.

(3) Third control program (A3, B3 and C3) performs a left turn steering control only.

(4) Fourth control program (A4, B4 and C4) performs both the brake control and the right turn steering control.

(5) Fifth control program (A5, B5 and C5) performs both the brake control and the left turn steering control. In those programs in which two different controls are induced, the two controls are performed in time sharing, namely, one after another, for a stable control.

Figure 7:
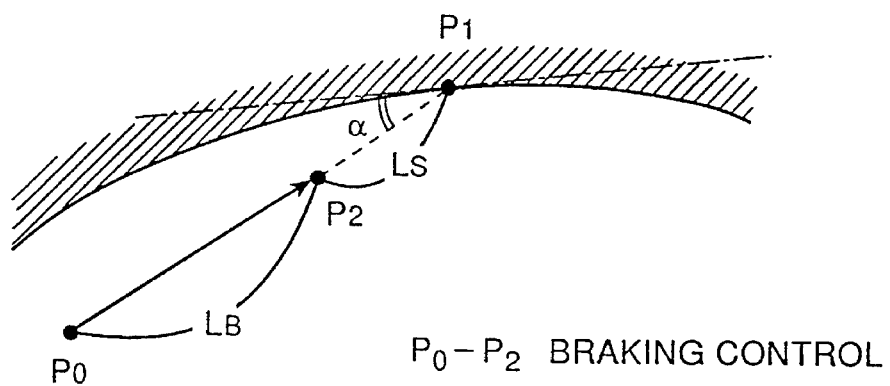
FIGS. 7–9 are explanatory views illustrating control programs for a first drive situation provided in the table of FIG. 3.
Figure 8:
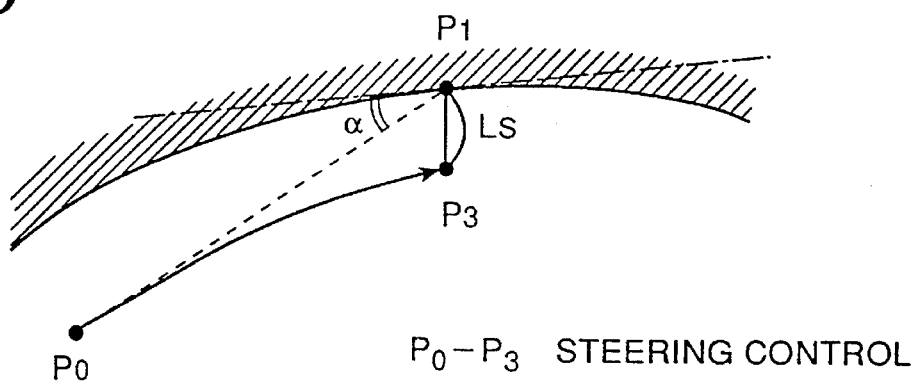
Figure 9:
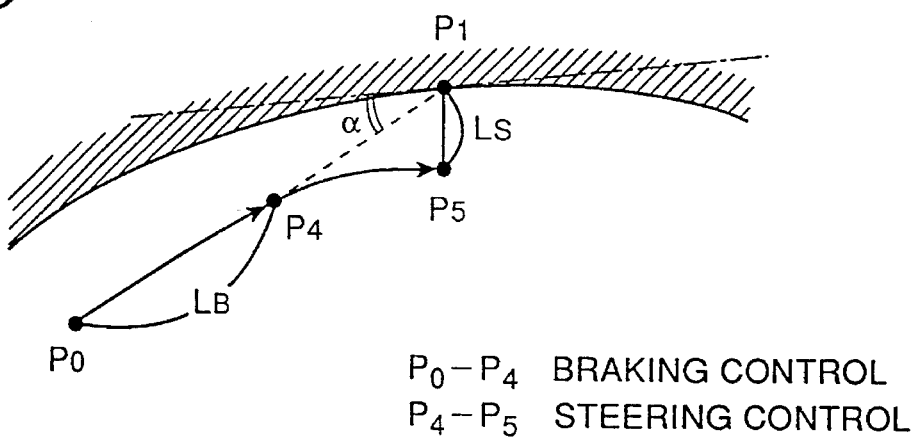

In the first control program (A1) for the drive situation (A) as shown in FIG. 7, the drive control system controls the brake system to keep a braking distance LB so as to stop the car at a safety position P2 which is at a safety distance LS before the predicted crash position P1. In the second control program (A2) for the drive situation (A) as shown in FIG. 8, the drive control system controls right turn steering so as to pull the car to its right side and pass the right side safety position P3 separate from a predicted crash position P1 at a safety distance LS sideways from the predicted crash position P1. In the third control program (A3) for the drive situation (A), the drive control system controls left turn steering so as to pull the car to its left side and pass the left side of an obstruction on the left side of the path in the same manner as in the second control program (A2). In the fourth control program (A4) for the drive situation (A) as shown in FIG. 9, the drive control system controls the brake system in a braking distance LB so as to pull the car to its right side and pass a safety position P5 which is at a safety distance LS before the predicted crash position P1. The drive control system then controls right turn steering so as to pull the car to the right and pass the right side safety position P5 of an obstruction which is at a safety distance LS sideways from the predicted crash position P1. In the fifth control program (A5) for the drive situation (A), the drive control system controls left turn steering so as to pull the car to the left and pass the left side of an obstructive on the left side of the path in the same manner as in the fourth control program (A4).

Figure 10:
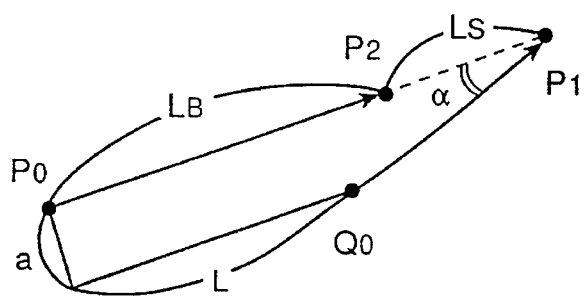
FIGS. 10–12 are explanatory views illustrating control programs for a second drive situation provided in the table of FIG. 3.
Figure 11:
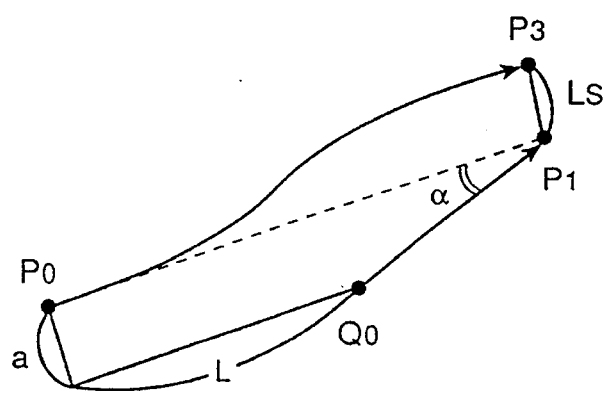
Figure 12:
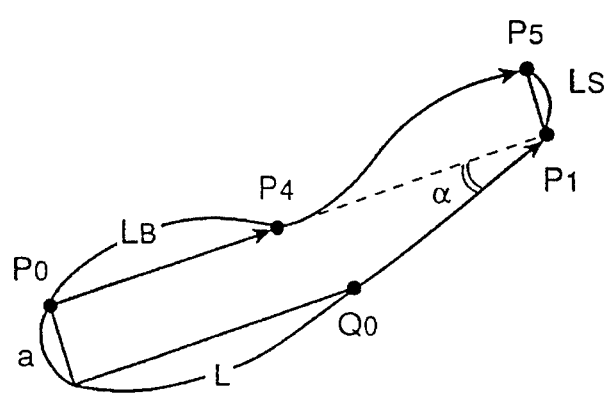

For the drive situation B, in the first control program (B1) as shown in FIG. 10, the drive control system controls the brake system in a braking distance LB so as to stop the car at a safety position P2 which is at a safety distance LS before as predicted crash position P1. In the third control program (B3) as shown in FIG. 11, the drive control system controls left turn steering so as to pull the car and change its path toward the left side and pass a safety position P3 separated from a predicted crash position P1 at a safety distance LS sideways from the predicted crash position P1. In the second control program (B2), the drive control system controls right turn steering so as to pull the car to the right and pass the right side of an obstructive on the right side of the path in the same manner as in the third control program (B3). In the fifth control program (B5) as shown in FIG. 12, the drive control system controls the brake system in a braking distance LB so as to pull the car so that it passes a safety position P4 before the predicted crash position P1. The drive control system then controls left turn steering so as to pull the car to the left and pass the left side safety position P5 separated from the predicted crash position P1 at a safety distance LS sideways from the predicted crash position P1. In the fourth control program (B4), the drive control system controls left turn steering so as to pull the car to the left and pass the left side of an obstruction on the left side of the path in the same manner as in the fifth control program (B5).

Figure 13:
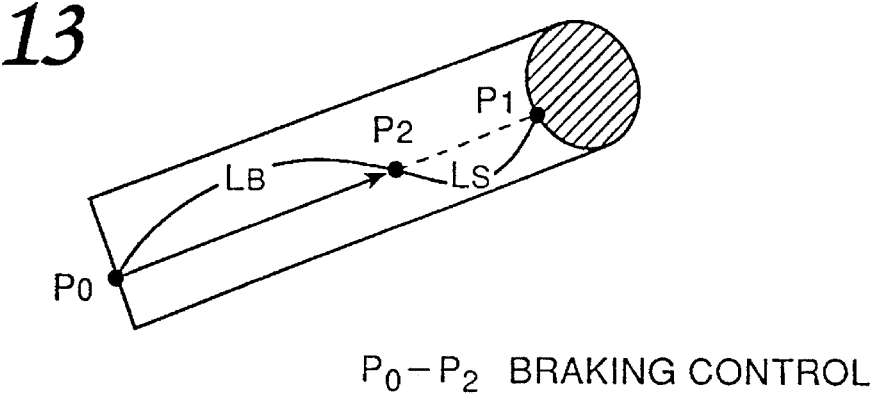
FIGS. 13–17 are explanatory views illustrating control programs for a third drive situation provided in the table of FIG. 3.
Figure 14:
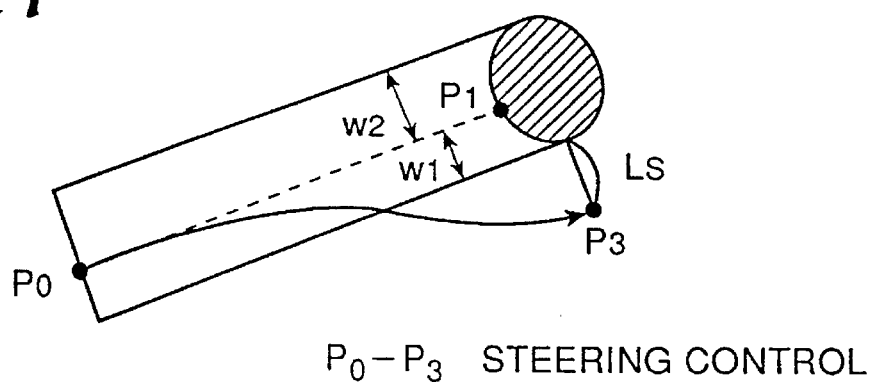
Figure 15:
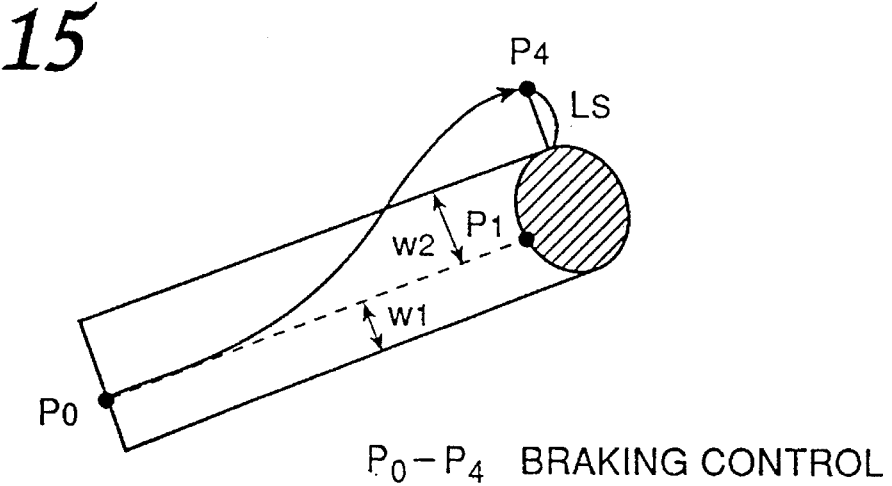
Figure 16:
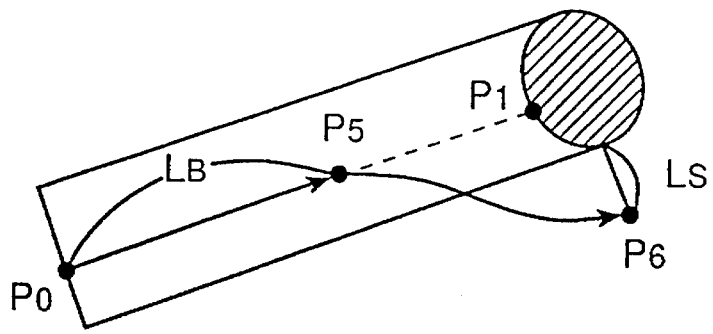
Figure 17:
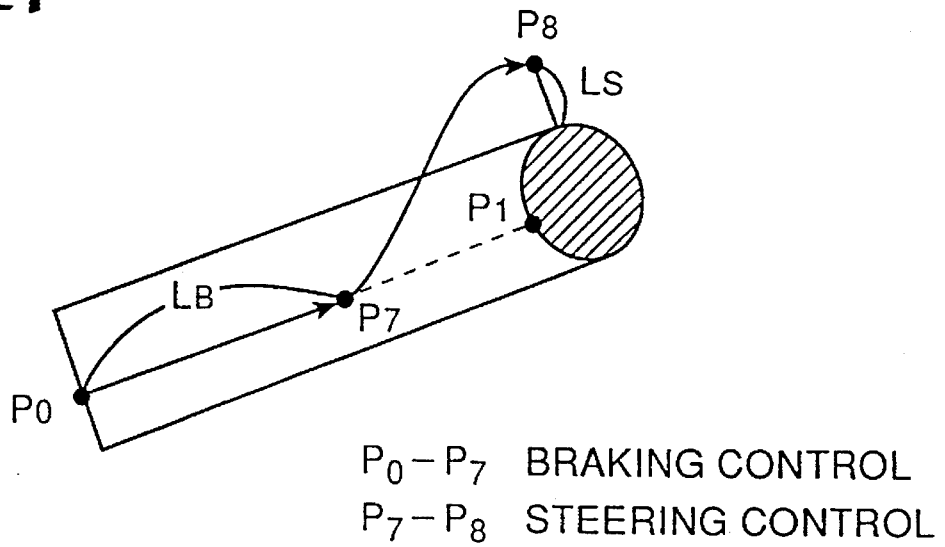

For the drive situation C, as shown in FIG. 13, in the first control program (C1), the drive control system controls the brake system in a braking distance LB so as to stop the car at a safety position P2 a safety distance LS before the predicted crash position P1. As shown in FIG. 14, in the second control program (C2), the drive control system controls right turn steering so as to pull the car to change its path toward the right side and pass a safety position P3 separated from a predicted crash position P1 at a safety distance LS sideways from the predicted crash position P1. As shown in FIG. 15, in the third control program (C3), the drive control system controls left turn steering so as to pull the car to the left and pass the left side of an obstruction on the left side of the path in the same manner as in the second control program (C2). As shown in FIG. 16, in the fourth control program (C4), the drive control system controls the brake system in a braking distance LB so as to brake the car to a position P5 before the predicted crash position P1 and then controls right turn steering so as to pull the car to the right and pass the right side safety position P6 at a safety distance LS sideways from the predicted crash position P1. As shown in FIG. 17, in the fifth control program (C5), the drive control system controls left turn steering after applying the brake to a position P7 so as to pull the car to the left and pass the left side safety position P8 at a safety distance LS sideways from the predicted crash position P1. In FIGS. 14 and 15, references W1 and W2 denote right and left lateral safety distances from the path of the car.

As described above, five different control programs are provided for each drive situation. The drive control scheduling device 4 selects one set of the control programs from the three sets of the control programs A1–A5, B1–B5 and C1–C5 according to a drive situation A, B or C determined by the determinator 3. The control execution device 6 executes one of the set of the control programs selected by the drive control scheduling device 4.

Considering the drive situation C as an example in order to describe selecting one of the sets of the control programs, the drive control scheduling device 4 selects only one from the prepared control programs C1–C5. If signals B(t) and S(t) provided by the control execution device 6 demands controlling of the brake system and the steering system beyond abilities of the car, it is impossible to execute. However, it is understood that theoretically, the car can be prevented from crashing against an obstruction in the path ahead by any one of the prepared control programs as long as driving conditions are controllable by the programs. It is, of course, possible to execute the programs with different efficiencies for the same drive condition. For example, comparing when the second control program C2 is conducted in the drive situation C, shown in FIG. 14, with when the third control program C3 is conducted in the drive situation C, shown in FIG. 15, if a right lateral safety distance W1 is larger than a left lateral safety distance W2, the car is controlled by the second control program C2 with a control efficiency higher than that of the third control program C3. On the other hand, comparing when the second control program C2 is conducted in the drive situation C with when the fourth control program C4 is conducted in the drive situation C shown in FIG. 16, if the car travels relatively slowly at a speed V, it can be said that it is more efficient to conduct the control program C2 than to conduct the fourth control program C4 because a crash of the car against an obstruction in a path ahead can be avoided only by steering control. However, if the car travels at a relatively high speed V, the second control program C2 needs a large acceleration component of steering, which indicates that a steering wheel should be turned quickly. Accordingly, in this event, since the fourth control program C4 is desirably conducted because, in the fourth control program C4, braking is conducted before steering and, consequently, an acceleration component of steering is suppressed.

For the reason stated above, one of the control programs, which has the smallest control burden among the five, is selected as an optimum control program. In this embodiment, in order to estimate a control burden (Z) of each control program, there are considered three parameters, such as a braking amount B(t), a steering amount S(t) and an acceleration component of the steering amount which are represented by signals S(B), S(S) and S(dS), respectively. By considering these parameters, a requirement that the steering wheel should be turned as slowly as possible is incorporated as one of the conditions for selecting the most desirable control program. A cost function COST(t) is defined by weighted parameters as follows:

$$COST(t) = aB(t) + bS(t) + cdS(t)$$

The control burden of each control program is estimated as an integrated value of the cost function COST(t) from a time t0, at which a crash eliminating operation is started, to a time at which a crash is eliminated. For example, when the determinator 3 determinates the car to be in the drive situation C, the drive control scheduling device 4 calculates control burdens Z1–Z5 for the respective control programs C1–C5 and selects one of the control programs C1–C5 which has the smallest control burden among the control burdens Z1–Z5. The control execution device 6 executes the selected control program so as to provide signals S(B) and S(S) necessary to control the braking amount B(t) and the steering amount S(t) by which the brake system and the steering system are controlled, respectively. In this manner, the car is controlled so as to avoid a crash against an obstruction in the path ahead by the use of the most desirable control program according to a drive situation.

Figure 18:
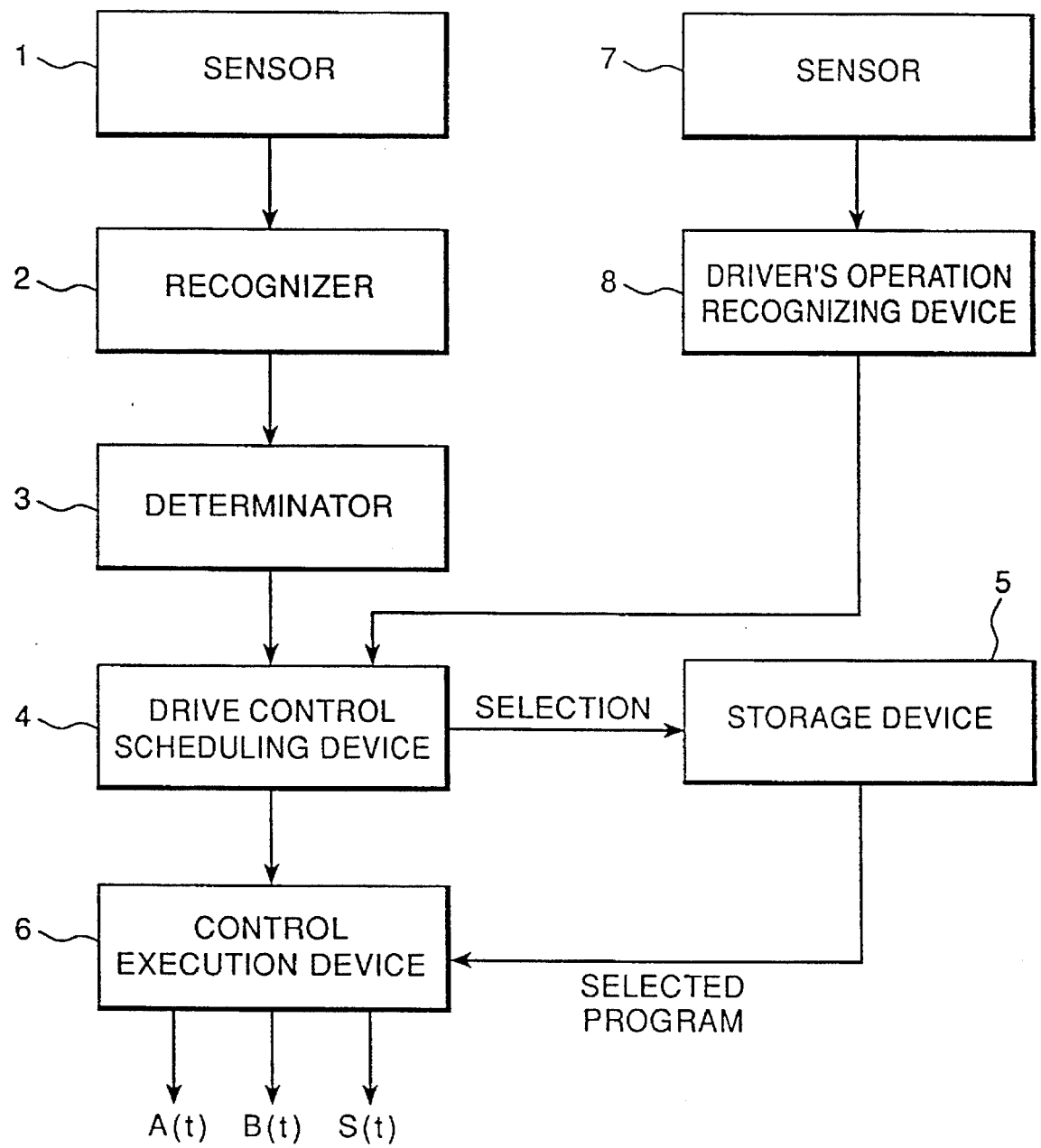
FIG. 18 is a schematic block diagram showing an automatic drive control system in accordance with another preferred embodiment of the present invention.

Referring to FIG. 18, an automatic drive control system in accordance another preferred embodiment of the present invention is shown, in which a driver's operation is taken into consideration to select the most desirable control program. The automatic drive control system includes a driver operation sensor 7 for detecting manually operated amounts of manual control elements, such as an accelerator pedal, a brake pedal and a steering wheel, by a driver of the car. The automatic drive control system further includes a driver operation recognizor 8 for recognizing whether the driver operates the manual control elements on the basis of signals provided from the driver operation sensor 7.

The drive control scheduling device 4 selects the most desirable control program on the basis of the result of the recognition made by the driver operation recognizor 8 as well as the result of the determination made by the determinator 3. The usage of the result of a recognition made by the driver operation recognizor 8 is understood from a table shown in FIG. 19. In the table, an operation or a control program marked by a symbol "X" is not applied in each drive situation A, B or C. Marked by a circle is a manual operation taken by a driver. If the driver takes no manual operation at all, a selection of the control programs is made for each drive situation A, B or C based on control burdens Z1–Z5 in the same manner as described previously.

When only the manual brake operation is made by the driver, the automatic drive control system executes selectively only the second and third control programs so as to control the steering system only. In more detail, the automatic drive control system executes either one of the second and third control programs which has a control burden Z smaller than that of the other control program. On the other hand, when only the manual steering operation is made by the driver, the automatic drive control system controls the brake system only. Accordingly, the automatic drive control system executes only the first control program. When both the manual braking operation and the manual steering operation are made by the driver, no control program is executed and a car crash against an obstruction in the path ahead is avoided by the driver.

An automatic drive control system may be adapted so that when an obstruction is detected in the path ahead, a judgement is made as to whether or not a driver has an intention to direct the car toward the obstruction. Considering, as an example, that the car is directed toward and gradually approaches a guard rail and, if it continues to travel in the direction, the car is predicted to crash into the guard rail a predicted time t later, it does not matter if the driver intentionally directs the car toward the guard rail. Such an intention is made when the driver stops the car beside the guard rail and when the driver voluntarily pulls the car to the guard rail so as to let a following car pass the car. However, if the driver unconsciously directs the car toward the guard rail or falls asleep while driving the car, the car will surely crash into the guard rail if the car continuously travels in the same direction. Therefore, the automatic drive control system according to the present embodiment is adapted to judge whether the car is unconsciously directed toward an obstruction in the path ahead when it detects the obstruction.

Figure 20:
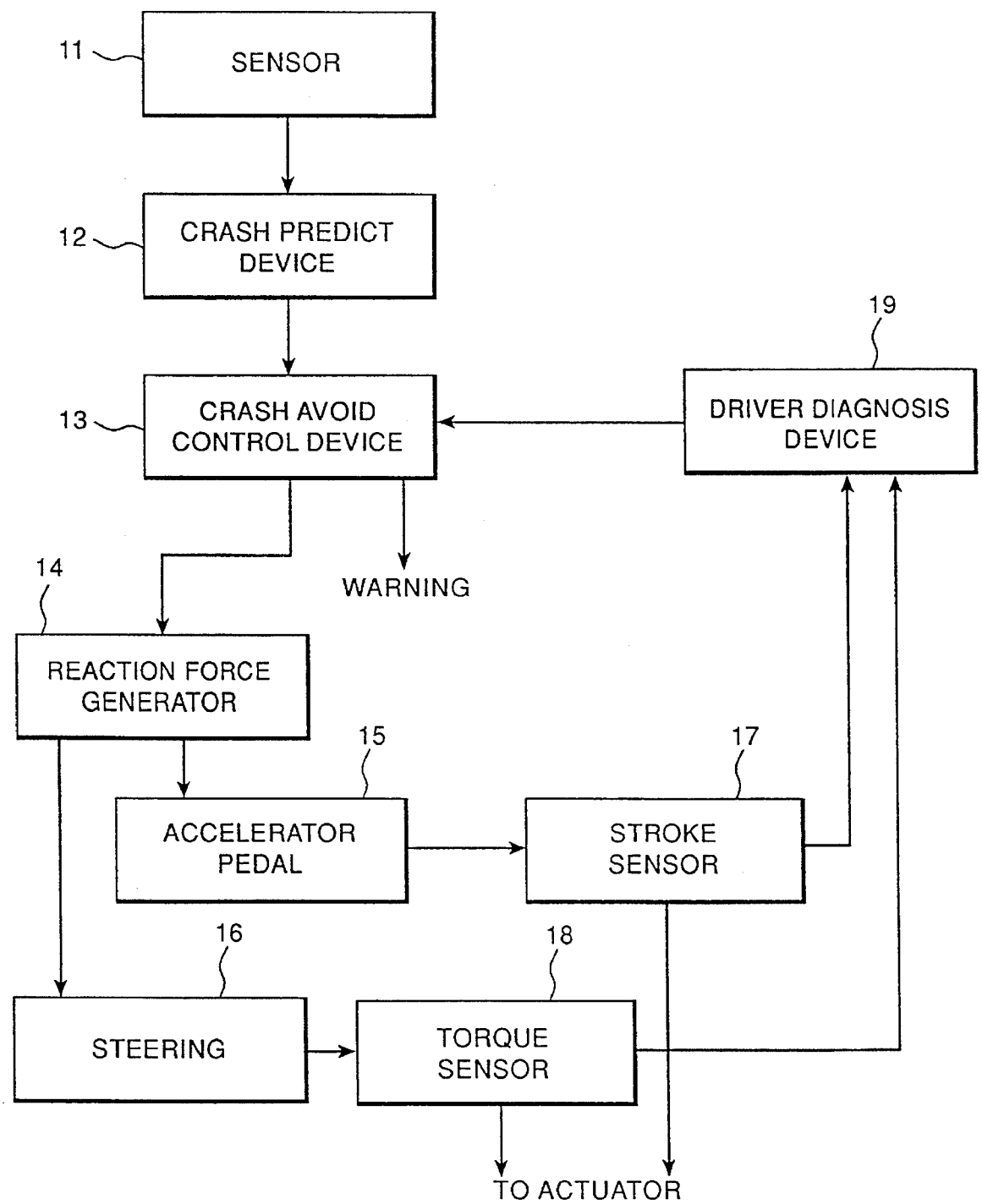
FIG. 20 is a schematic block diagram showing an automatic drive control system in accordance with still another preferred embodiment of the present invention.

Referring to FIG. 20, the automatic drive control system includes a sensor 11 for gathering environmental information of a path ahead the car in physical values. The sensor 11 may be a video camera for providing a video image of the path ahead of the car, a speed sensor for providing speed information of the car and a radar for detecting a distance between the car and a preceding car on the path ahead. A crash predicting device 12 predicts a crash of the car against an obstruction in the path ahead, such as a guard rail and a preceding car, based on the information provided by the sensor 11. A crash avoiding device 13, for calculating control values by which a brake system and a steering system are automatically controlled so as to avoid a crash of the car, has all the functions of the recognizor 2, the determinator 3, the drive control scheduling device 4, the control program storage device 5 and the control execution device 6 of the previous embodiments. The crash avoiding device 13 provides signals, representative of control values, by which the braking system and the steering system are controlled. The crash avoiding device 13 also provides a warning such as a warning sound.

A reaction force generating device 14 generates and gives reaction forces to an acceleration pedal 15 and a steering 16 based on the signals from the crash avoiding device 13. The reaction forces are applied to the acceleration pedal 15 and the steering 16 and cause to operate them so as to pull the car away from an obstruction. For example, if a crash with a preceding car is predicted, a reaction force is applied to the accelerator pedal 15 so as to move it back. Similarly, if a crash with a guard rail on the right side of the path ahead is predicted, a reaction force is applied to the steering 16 pedal so as to turn it in a counterclockwise direction. A control system of the car equipped with the automatic drive control system is of what is called a "drive-by-wire" type. For example, in a drive-by-wire type speed control system, a stroke of the accelerator pedal 15 is not directly and mechanically transmitted to a throttle valve, but is interpreted by an electric signal with which an actuator of the throttle valve is operated. Such a stroke of the accelerator pedal 15 is detected by a stroke sensor 17. Similarly, in a drive-by-wire type steering control system, a steering torque of the steering 16 is not directly and mechanically transmitted to a steering actuator but is interpreted by an electric signal with which the steering actuator is operated. Such a steering torque of the steering 16 is detected by a torque sensor 18. A driver diagnosis device 19 receives signals representative of a stroke of the accelerator pedal 15 and a torque of the steering 16 detected by the stroke sensor 17 and the torque sensor 18, respectively, and makes a diagnosis, on the basis of the signals, as to whether or not the driver is awake.

A reaction force generated by the reaction power generating device 14 is explained by a function of time F(t), and an actually operated stroke of the accelerator pedal 15 detected by the stroke sensor 17 or an actual torque applied to the steering 16 detected by the torque sensor 18 is explained by a reaction defined by a function of time R(t). The actual stroke and the actual torque represent a reaction to an operation by the driver. Here, a reaction level E of the driver is defined as an integration of a function G(t) for a predetermined time t.

$$G(t)=[R(t)/F(t)]^2$$

The reaction level E indicates a magnitude of an operation force by the driver against a reaction force for the time t.

The driver diagnosis device 19 makes a diagnosis on the basis of a reaction level E. That is, if the reaction level E is larger than a predetermined level Ce, it is judged that the driver is consciously driving the car. Otherwise, if the reaction level E is equal to or smaller than the predetermined level Ce, it is judged that the driver is unconsciously driving the car. The crash avoiding device 13 voluntarily removes signals representative of control values by which the braking system and the steering system are controlled if the driver diagnosis device 19 judges that the driver is consciously driving the car. On the other hand, the crash avoiding device 13 holds the signals so as to avoid a crash of the car against an obstruction in the path ahead if the driver diagnosis device 19 judges that the driver is unconsciously driving the car and, if necessary, gives a warning.

Considering an example, when the crash predicting device 12 predicts a crash of the car against a preceding car in the path ahead, the crash avoiding device 13 provides a representative of a control value by which the accelerator pedal 15 should be moved back so as to decelarate the car. Accordingly, the accelerator pedal 15 has a reaction force applied to it so as to be moved back. If the driver consciously drives the car so as to approach the preceding car, because the accelerator pedal 15 must be depressed with a force sufficient to overcome the reaction force F(t), a reaction value R(t) larger than the reaction force F(t) must be obtained. Accordingly, the reaction level E becomes larger than the predetermined level Ce and it is judged that the driver is consciously approaching the preceding car. In this event, the crash avoiding device 13 voluntarily removes signals representative of control values so as to decelerate the car according to the driver's intention. However, if the driver is driving with a low consciousness or is driving the car while asleep, since the driver is unable to continuously depress the accelerator pedal 15 with a depression force sufficiently strong against the reaction force F(t), the accelerator pedal 15 is moved back by the reaction force F(t). Accordingly, the reaction value R(t) becomes smaller than the reaction force F(t). Accordingly, the reaction level E becomes equal to or smaller than the predetermined level Ce and it is judged that the driver is unsonsiously approaching the preceding car. Then, the crash avoiding device 13 continuously provides a signal so as to avoid a crash of the car and give the driver a warning.

Considering another example, when the crash predicting device 12 predicts a crash of the car against a guard rail on the left side of the path ahead, the crash avoiding device 13 provides a signal for right turn steering. That is, the steering 16 is applied with a clockwise reaction force F(t). If the driver consciously drives the car so as to approach the guard rail, because the steering 16 is considered to be operated counterclockwise with a sufficient to overcome the reaction force F(t), a reaction R(t) larger than the reaction force F(t) must be obtained. Accordingly, the reaction level E becomes larger than the predetermined level Ce and it is judged that the driver is consciously approaching the guard rail. In this event, the crash avoiding device 13 removes the signal of right turn steering so as to allow the driver to pull the car toward the left. However, if the driver is driving with a low consciousness or is driving the car asleep, since the driver is unable to turn continuously steering 16 counterclockwise with a turning force sufficiently strong against the reaction force F(t), the steering 16 is turned clockwise by the reaction force F(t). Accordingly, the reaction value R(t) becomes smaller than the reaction force F(t). Accordingly, the reaction level E becomes equal to or smaller than the predetermined level Ce and it is judged that the driver is unconsciously pulling the car toward the guard rail. Then, the crash avoiding device 13 continuously provides a steering control signal so as to avoid a crash of the car and give the the driver a warning.

A reaction force F(t) for pulling the car away from an obstruction should be larger than a predetermined force Ta necessary to detect a driver's reaction force. However, the reaction force should be smaller than a predetermined force Tb sufficient to disturb the driver while consciously driving the car.

It is to be understood that the present invention has been described in detail with respect to specific embodiments. However, various other embodiments and variants may occur to those skilled in the art. Such other embodiments and variants which fall within the scope and spirit of the invention are intended to be covered by the following claims.

What is claimed is:

1. An automatic drive control system for a car comprising:

recognizing means for recognizing external circumstances in a path ahead of the car;

drive situation determining means for determining a drive situation of the car on the basis of circumstances recognized by said recognizing means;

program storage means for storing control programs prepared for a plurality of different drive control modes according to previously specified drive situations;

control scheduling means for selecting at least one of said control programs according to a drive situation determined by said drive situation determining means;

control means for providing control signals in accordance with said at least one of said control programs selected by said control scheduling means; and actuators for providing said car with speed and direction control in response to said control signals.

2. An automatic drive control system as defined in claim 1, wherein said actuators include actuators for operating a steering system.

3. An automatic drive control system as defined in claim 1, wherein said actuators include actuators for operating a speed control system.

4. An automatic drive control system as defined in claim 1, and further comprising driver operation diagnosis means for recognizing a driver's operation, said control scheduling means selecting a control program based on a driver's operation recognized by said driver operation diagnosis means.

5. An automatic drive control system as defined in claim 1, wherein said control programs are prepared for a plurality of different speed control modes according to the previously specified drive situations.

6. An automatic drive control system as defined in claim 1, wherein said previously specified drive conditions are specified by a driver.

7. An automatic drive control system for a car comprising:

recognizing means for recognizing external circumstances in a path ahead of the car;

drive situation determining means for determining a drive situation of the car on the basis of circumstances recognized by said recognizing means;

program storage means for storing a plurality of control programs prepared according to specified drive situations;

control scheduling means for selecting at least one of said control programs according to a drive situation determined by said drive situation determining means;

control means for providing control signals in accordance with said at least one of said control programs selected by said control scheduling means; and actuators for providing said car with speed and direction control in response to said control signals;

wherein said control signals control said actuators in accordance with a control program which has a minimum control burden among control burdens for said at least one of said control programs.

8. An automatic drive control system for a car comprising:

a recognizing device for recognizing external circumstances in a path ahead of the car;

a drive situation determining device for determining a drive situation of the car based on circumstances recognized by said recognizing device;

a program storage device for storing control programs including steering control programs and speed control programs prepared for a plurality of different drive control modes according to previously specified drive situations;

a control scheduling device for selecting at least one of said control programs according to a drive situation determined by said drive situation determining device;

a control device for providing control signals in accordance with said at least one of said control programs selected by said control scheduling device; and actuators for providing said car with speed and direction control in response to said control signals.

9. An automatic drive control system as defined in claim 8, wherein said control device controls an acceleration system and a braking system according to one of said control programs.

10. An automatic drive control system as defined in claim 8, and further comprising a driver operation recognizing device for recognizing operations by a driver of the car, and wherein said control scheduling device selects a program which has a minimum control burden according to operations recognized by said driver operation recognizing device.

11. An automatic drive control system as defined by claim 8, and further comprising a driver diagnosis device for judging whether a driver is aroused, and a danger avoiding control device for controlling said car control elements, depending on (a) when the drive is aroused as judged by said driver diagnosis device and (b) the external circumstances recognized by said recognizing device, so as to avoid danger.

12. An automatic drive control system as defined in claim 8, wherein said recognizing device includes an imaging device for imaging external circumstances in said path.

13. An automatic drive control system as defined in claim 8, wherein said control programs are prepared for a plurality of different speed control modes according to the previously specified drive situations.

14. An automatic drive control system as defined in claim 8, wherein said previously specified drive conditions are specified by a driver.

15. An automatic drive control system for a car comprising:

a recognizing device for recognizing external circumstances in a path ahead of the car;

a drive situation determining device for determining a drive situation of the car based on circumstances recognized by said recognizing device;

a program storage device for storing a plurality of control programs including steering control programs and speed control programs prepared according to specified drive situations;

a control scheduling device for selecting at least one of said control programs according to a drive situation determined by said drive situation determining device;

a control device for providing control signals in accordance with said at least one of said control programs selected by said control scheduling device; and actuators for providing said car with speed and direction control in response to said control signals;

wherein said control device controls an acceleration system and a braking system according to one of said control programs and said control scheduling device selects a control program which provides a lowest speed.

16. An automatic drive control system for a car comprising;

a recognizing device for recognizing external circumstances in a path ahead of the car;

a drive situation determining device for determining a drive situation of the car based on circumstances recognized by said recognizing device;

a program storage device for storing a plurality of control programs including steering control programs and speed control programs prepared according to specified drive situations;

a control scheduling device for selecting at least one of said control programs according to a drive situation determined by said drive situation determining device;

a control device for providing control signals in accordance with said at least one of said control programs selected by said control scheduling device; and actuators for providing said car with speed and direction control in response to said control signals;

wherein said control scheduling device selects one of said control programs which provides a minimum control burden.

17. An automatic drive control system as defined in claim 16, wherein said control device executes a steering control and a speed control selectively according to said one of said control programs selected by said control scheduling device.

18. An automatic drive control system as defined in claim 16, wherein said control device executes one of a steering control and a speed control after another of the steering control and the speed control.

\* \* \* \* \*